No. 735,356. PATENTED AUG. 4, 1903.
T. M. FISHER.
MINING TOOL.
APPLICATION FILED MAR. 31, 1903.
NO MODEL.
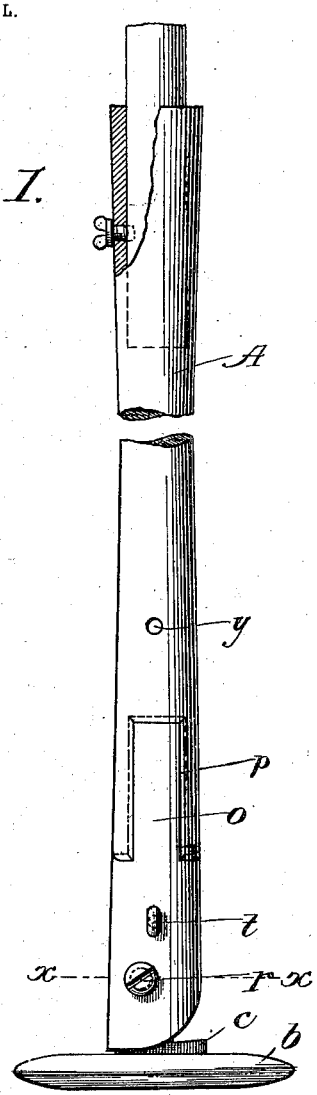
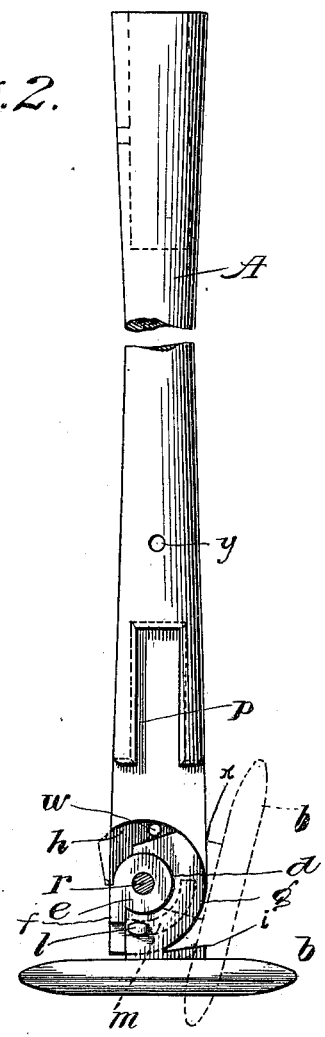
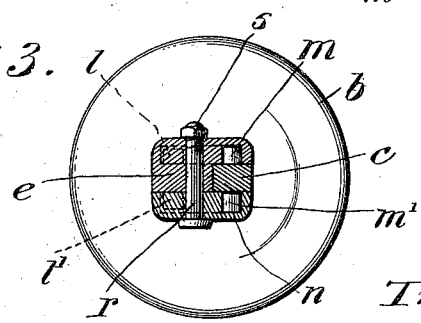
Witnesses
Fenton S. Belt,
Chauncey E. Trainor
Inventor
Thomas M. Fisher,
by Geo. B. Morton
Attorney No. 735,356. Patented August 4, 1903.

UNITED STATES PATENT OFFICE.

THOMAS MASSAM FISHER, OF MONTGOMERY, INDIANA.

MINING-TOOL.

SPECIFICATION forming part of Letters Patent No. 735,356, dated August 4, 1903.

Application filed March 31, 1903. Serial No. 150,454. (No model.)

*To all whom it may concern:*

Be it known that I, THOMAS MASSAM FISHER, a citizen of the United States, residing at Montgomery, in the county of Daviess and State of Indiana, have invented certain new and useful Improvements in Mining-Tools, of which the following is a specification.

My invention relates to tools for removing the cuttings from drill-holes, especially holes drilled for blasting in coal-mines, and has for its object to provide a tool which is simple in construction and effective in purpose and which may be used, first, to clean the drill-hole, and, second, to tamp the blasting charge. These objects I accomplish by the means hereinafter described and claimed, reference being had to the accompanying drawings, in which—

Figure 1 is a side elevation of my improved tool. Fig. 2 is a view similar to Fig. 1, but with the fastening-piece removed and with the disk shown in dotted lines in its inward position; and Fig. 3 is a sectional view on line $xx$, Fig. 1.

Like characters refer to like parts throughout the several figures of the drawings.

A is the handle, which may be of any desired length, and $b$ is the cleaning-disk. The disk $b$ is circular and is provided at its center with a stem $c$, rigidly secured thereto or integral therewith, which is cut away on its upper side at $d$ to fit a bearing $e$, formed on the handle $a$. A shoulder $f$ is provided on the handle $a$ to limit the outward turn of the disk $b$ to a position perpendicular to the said handle. The stem $c$ is curved on its lower side at $g$ to turn in a groove $h$ on the handle $a$ and is provided with an inclined shoulder $i$, which engages the handle at $k$ to retain the disk at a slight angle to the handle $a$ for a purpose hereinafter explained.

Guide-pins $l\ l'$ are provided on either side of the stem $c$ to engage corresponding grooves $m\ m'$ in the handle $a$ and fastening-piece $n$, respectively. The fastening-piece $n$ has a tongue $o$, which fits in a corresponding groove $p$ in the handle. A bolt $r$, provided with a nut $s$, is passed through the bearing $e$ and the fastening-piece $n$ to retain the parts in their proper position.

The operation of the device is as follows: With the parts in the position shown in Fig. 2 in dotted lines and held in a position such that the cleaning-disk is on the under side of the handle the tool is thrust into the hole to be cleaned. In going into the hole the disk readily passes over the cuttings; but on being drawn back, because of its inclined position, the disk is engaged by the rough surface of the drill-hole at its lower edge and turned back until the stem $c$ comes into contact with the shoulder $f$ and is held in that position, and thus brings out with it the material to be removed.

When it is desired to use the tool for tamping the blast, the disk is turned to its position perpendicular to the handle and a spring-cotter $t$ inserted in a hole $w$ to engage the end of the stem $c$ and lock the disk in such position. A second hole $y$ is provided in the handle to retain the cotter when not in use.

A bolt may be used, if desired, instead of the cotter $t$; but I prefer to use a spring-cotter because no fastening means are required to hold it in place.

What I claim as new, and desire to secure by Letters Patent, is—

1. The combination, in a tool, of a handle, a disk centrally pivoted to said handle, means for limiting the inward movement of said disk to a position such that the plane of said disk is inclined to said handle, means for limiting the outward movement of said disk to a position perpendicular to said handle, and means for locking said disk in such position, substantially as described.

2. The combination in a tool, of a handle provided with a fixed and a removable ear, a disk provided with a centrally-placed lug adapted to turn between said ears, a stop to limit the outward movement of the disk, and a second stop to limit the inward movement of the disk to a position such that the plane of said disk is inclined to said handle, substantially as described.

3. The combination in a tool, of a handle provided with ears, a circular groove in one of said ears, a stop at the end of said groove, a disk provided with a lug having a part adapted to turn in said groove, and having a stop adapted to contact with said handle to limit the inward movement of said disk to a position such that the plane of the disk is inclined to said handle.

4. The combination in a tool, of a handle provided with ears, a circular groove in the inner side of one of said ears, a stop at the outer end of said groove, guide-slots in said ears, a disk provided with a lug adapted to turn in said groove, pins projecting laterally from said lug and adapted to move in said guide-slots, and an inclined shoulder on said disk to limit the inward movement thereof, substantially as described.

In testimony whereof I have signed my name to this specification in the presence of two subscribing witnesses.

THOMAS MASSAM FISHER.

Witnesses:
    J. P. JAGER,
    J. C. SMITH.